Jan. 9, 1934.  O. LEE  1,942,897
COOLING AND MOISTENING MATERIAL
Filed June 3, 1932
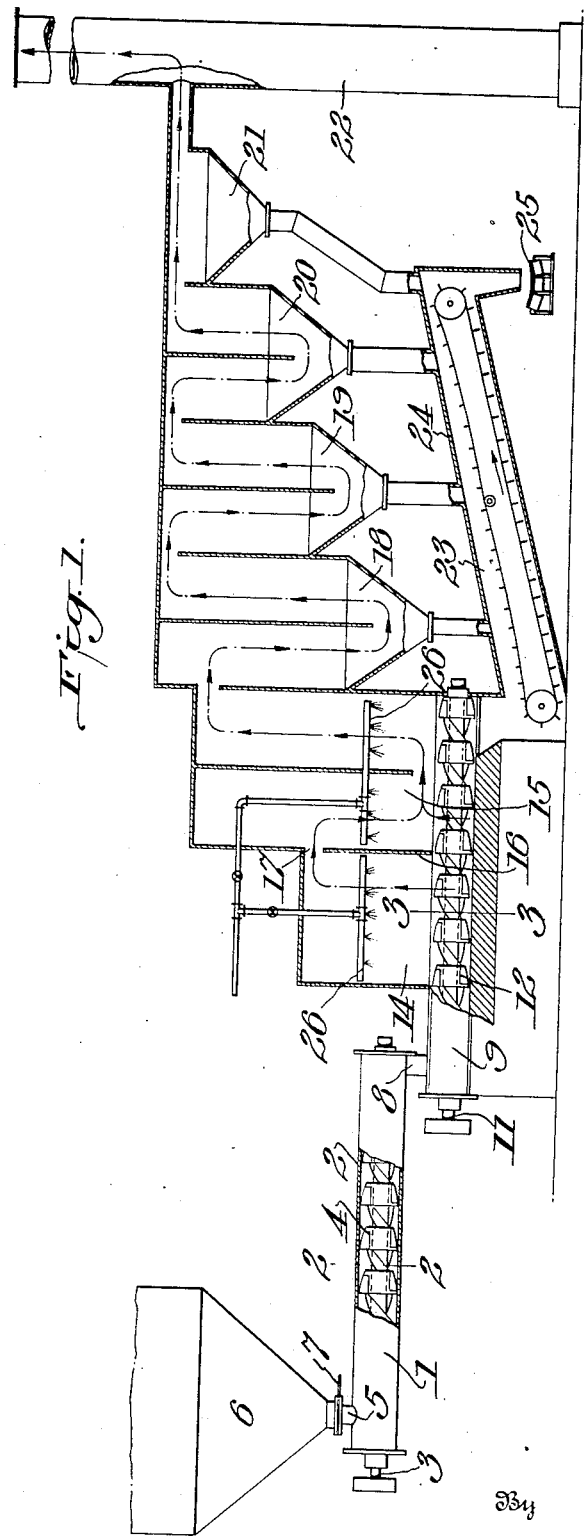
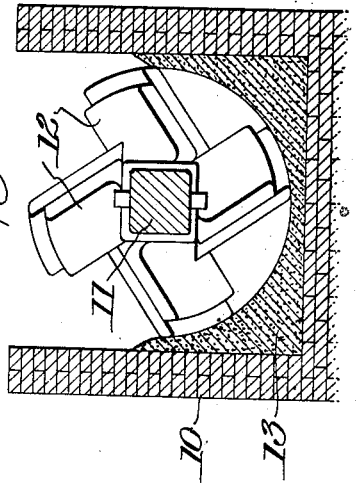
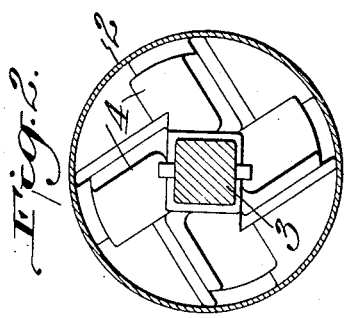
Inventor:
Oscar Lee
By Byrnes, Townsend & Potter
Attorney Patented Jan. 9, 1934

1,942,897

UNITED STATES PATENT OFFICE 1,942,897

COOLING AND MOISTENING MATERIAL

Oscar Lee, Isabella, Tenn.

Application June 3, 1932. Serial No. 615,238

8 Claims. (Cl. 266—1)

The invention relates to a method and apparatus for cooling, moistening and conveying hot, dusty materials such as calcines derived from the roasting of sulphide ores or concentrates, and like materials. It is particularly adapted to treating such materials preparatory to magnetically separating or concentrating the same, or preparatory to agglomerating, for example, by a sintering process.

The object of the invention is to so treat hot, dusty materials (that otherwise would be inconvenient and hazardous to handle) that the same shall be cooled and/or moistened to such predetermined degree as may be desired and as may be requisite for subsequent treatment.

It is well known that very hot dust (for example of 400° C. or higher temperature) has the property of flowing like a liquid; that is to say, instead of settling and reposing in a fairly consistent aggregate as do finely divided materials at atmospheric temperatures, the highly heated material appears to acquire a state of mobility in which each individual solid particle is separated from its neighbor by a film or envelope of gas. This may be possibly due to electro-static properties whereby the finely divided particles all acquire an electric charge of like polarity and, consequently, tend to repel each other,—the hot gases (substantially free of moisture) in which the particles are confined thereby serving as a separating medium of high dielectric value.

Because of the high fluidity of hot dust, it becomes difficult to retain the material in any but tightly sealed containers, and any leakage becomes a menace to workmen who thus become exposed to accidental burns.

Furthermore, dust or finely divided material at high temperatures is exceedingly difficult to wet by any ordinary means. If water or other liquid be applied in considerable quantity, there is produced a great hazard of explosion due to rapid evolution of steam; if, on the other hand, it is attempted to moisten the hot dust with a water spray or other device by means of which water may be applied in small amounts at a time, the high temperature of the dust instantly converts the moisture into steam and repels it, or at best the material is only superficially and inadequately moistened.

The only way of satisfactorily coping with such a problem lies in first reducing the temperature of the hot material to a degree approximating the boiling point of water and preferably somewhat lower, and then the partially cooled material should be kept in constant agitation while being further quenched and moistened with water or other liquid.

A principal object of the invention is the provision of means for effecting the cooling and/or moistening of such hot material in an economical and satisfactory manner.

The invention briefly comprises in combination means for preliminarily cooling the material by conduction and radiation of heat, means for further cooling and/or moistening the material by means of a cooling liquid and means for recovering dust and fume arising from the cooling.

The invention will be particularly described for the purpose of illustration with reference to the accompanying drawing, in which:

Fig. 1 represents an elevation in partial section of an embodiment of the invention;

Fig. 2 is a section on line 2—2 of Fig. 1; and

Fig. 3 is a section on line 3—3 of Fig. 1.

Dry cooling stage

This is the first step in the invention and is accomplished in that part of the apparatus designated by the numeral 1. This comprises a horizontal, or slightly inclined cylindrical metallic vessel 2 fitted with tightly closed ends; to the latter are attached suitable bearings through which passes a shaft 3 which extends along the axis of the cylinder. To the shaft are attached paddles or blades 4. This apparatus is preferably constructed by using a square shaft, having rounded ends to fit the bearings, and upon this shaft are slipped the castings which have correspondingly squared openings and which carry the attached paddles or blades. The blades are attached at such an angle that, when the shaft is rotated, the material with which they come in contact is caused to be conveyed forward in a manner similar to a spiral conveyor. From experience, however, it has been found that a plurality of small blades produces an agitation of the material which is conducive to more rapid cooling and this device is also less likely to become obstructed and consumes less power in its operation; consequently it is preferred to a continuous spiral conveyor.

The shaft bearing the paddles or blades may, of course, be rotated by means of a sprocket and chain or by gearing, or any other mechanical means.

The cylinder 2 is without lining and it is constructed of steel or other metal that will afford rapid conduction and radiation of heat; for this reason, also, no covering or heat insulation is applied to the exterior of this cylinder or casing.

At the forward end of the cylinder 2, an opening 5 connects with the hopper or bin 6 in which are accumulated the calcines from the roasting furnace or from like source. The gate 7 is employed to regulate the flow of hot material into the cooling apparatus and at the rearward end another opening 8 permits delivery of the cooled material to the next stage where moistening is accomplished in apparatus 9.

In the drawing, the dry cooling apparatus is shown to consist of but one unit, but two or more such units may be used in series or in multiple arrangement to afford a greater cooling effect. It is, of course, to be understood that the size or proportions as well as the arrangement of the cooling unit, or units, may be varied without departing from the intent or scope of the invention.

*Moistening stage*

When by means of the previous cooling stage the temperature of the hot material has been reduced to the proper degree, the material enters the apparatus 9 by gravity flow through the opening 8. The mechanically moving parts of apparatus 9 are constructed similarly to those of apparatus 2, and preferably these parts should be made to be interchangeable, and thereby reduce the cost of replacements due to wear or breakage. The construction of the stationary parts is, however, quite different, for the following reasons:

(a) The material, now greatly reduced in temperature, no longer possesses the fluidity and consequent easy transportability afforded by the material in its previously hot condition.

(b) The addition of moisture produces a consistency of the material which renders it more difficult to convey and in this condition produces more abrasion or erosion of all wearing parts.

(c) The addition of moisture, also, immediately causes any soluble salts (sulphates, chlorides, etc.) contained in the material handled to partially go into solution and the dissolved salts cause rapid corrosion of such parts of the apparatus to which they may have free access.

For these reasons, the casing of apparatus 9 is preferably not made cylindrical in form but instead is built of rectangular section as shown in Fig. 3; it is also lined with acid-proof brick walls and bottom 10; and the shaft 11, which bears the rotatable blades 12, is not located at the lowest practical area but considerably higher. Thus there is afforded a substantial clearance between the tips of the rotating blades and the containing side-walls and bottom of the brick-lined portion of the apparatus. Hence, outside the sweep of the blades (in the lower portion of the apparatus) the moistened calcines accumulate, and gradually build up a practically impervious and permanent bed or trough 13; the dissolved salts soon concentrate upon the surface thus formed and so produce a glazed surface over which the moving material is readily transported with but little resistance; the wear and corrosion is thus confined to the blades which are themselves readily replaceable when necessary.

Superimposed over the apparatus 9 are two adjoining moistening chambers 14 and 15, separated by the partition wall 16 and through the latter a port or opening 17 is provided for passage of steam and any dust-laden gases. Further chambers 18, 19, 20 and 21 for the collection of dust and fumes are also provided. Partition walls are, in each instance, so arranged as to enforce a zig-zag, or alternately ascending and descending, flow of gases through the dust precipitating chambers 14, 15, 18, 19, 20 and 21 to the stack 22.

Any dust that may be precipitated in chambers 14 and 15 will, of course, return to the apparatus 9 and, in turn, be delivered to the dust conveyor 23. Hoppers and outlets are also provided by the bottoms of chambers 18, 19, 20 and 21 and these are each, in turn, provided with downward extending chutes or ducts to deliver any precipitated dust to the dust conveyor 23.

The dust conveyor 23, advantageously comprises an inclosed casing 24 in which is installed a drag-chain conveyor which collects all of the material from apparatus 9 and from the dust precipitating chambers 18, 19, 20 and 21, thence delivering it to a conveyor belt 25 or to any other provided means for transporting the product to its desired destination. The drawing illustrates the collecting conveyor 23 in an inclined position, but it is to be understood that it may as readily be disposed in a horizontal position. Neither is it necessary that the collecting conveyor 23 and the dust precipitating chambers 18, 19, 20 and 21 be placed in the same vertical plane as apparatus 2 and apparatus 9, but can be arranged at right angles thereto, or at any other angle that choice or circumstances may dictate. Also, as an alternative, a spiral conveyor may be utilized in place of the drag-chain conveyor 23 for collecting the material from apparatus 9 and from the dust precipitating chambers 18, 19, 20 and 21; or similar conveying and transporting devices may be employed without departing from the invention.

By means of proper regulation of the flow of water or other liquid through the sprays 26, the temperature of the material, as well as the moisture content thereof, may be varied as desired. It is possible to reduce the amount of water thus used to such a point that the material will be delivered substantially free of moisture; and it is as easily possible to admit sufficient water to deliver the material in a decidedly wet condition; in many metallurgical processes it is often desirable, or indeed necessary, that the moisture content of the material thus cooled and moistened be subject to adjustment over comparatively wide ranges and yet with perfect control.

I claim:

1. Apparatus for cooling, moistening, and conveying hot dusty materials comprising in combination, conveying means adapted for subjecting such materials to partial cooling by radiation and conduction of heat, a second conveying means, means for subjecting the partially cooled materials therein to direct contact with a cooling liquid, and means for recovering dust and fumes arising from said action of cooling liquid.

2. Apparatus for cooling, moistening and conveying hot dusty materials comprising in combination, a conveying means adapted to contact the material with heat conductive radiation surfaces, a second conveying means adapted to agitate the material in the presence of a cooling liquid, means for subjecting said material to direct contact with a cooling liquid while in said second conveying means, and settling chambers so connected thereto as to collect the dust and fumes arising from said second conveying means.

3. Apparatus for cooling, moistening, and conveying hot dusty materials comprising in combination a broken flight spiral conveyor adapted to contact the material with heat conductive radiation surfaces, a second broken flight spiral conveyor adapted to agitate the material in the presence of a cooling liquid, means for subjecting said material to direct contact with a cooling liquid while in said second conveying means, and settling chambers adapted to collect the dust and fumes arising from said second conveying means.

4. Apparatus for cooling, moistening, and conveying hot dusty materials comprising in combination a broken flight spiral conveyor adapted to contact the material with heat conductive radiation surfaces, a second broken flight spiral conveyor adapted to agitate the material in the presence of a cooling liquid, spraying devices for subjecting said material to direct contact with a cooling liquid while in said second conveying means, and settling chambers adapted to collect the dust and fumes arising from said second conveying means.

5. Apparatus for cooling, moistening and conveying hot dusty materials comprising three conveyors for said materials adapted to serially convey said materials, the first of said conveyors being adapted to provide cooling of the material by radiation and conduction of heat therefrom, the second of said conveyors being adapted to agitate said material in the presence of a cooling liquid and being operatively associated with supply means for cooling liquid and with settling chambers so connected thereto as to collect the dust and fumes from said second conveyor, and the third conveyor being adapted to collect and transport material from said second conveyor and from said settling chambers.

6. A method of cooling and moistening hot dusty materials which comprises subjecting said materials to cooling to about 100° C. by radiation and conduction of heat, thereafter subjecting said partially cooled materials to direct contact with an aqueous cooling liquid, and passing the dust and fumes arising from the action of said cooling liquid in a tortuous path through settling chambers.

7. A method of cooling and moistening hot dusty materials which comprises conveying said materials in contact with a heat-conductive radiation surface and thereafter spraying said materials with cooling liquid while agitating and conveying the same.

8. A method of cooling and moistening hot dusty materials which comprises conveying said materials in contact with a heat-conductive radiation surface until they are reduced in temperature to about 100° C., and thereafter spraying said materials with aqueous cooling liquid while agitating and conveying the same.

OSCAR LEE.